United States Patent [19]

Rohde

[11] E Re. 30,276

[45] Reissued May 20, 1980

[54] APPARATUS FOR STOPPER REMOVAL

[75] Inventor: Vernon C. Rohde, Newtown, Conn.

[73] Assignee: E. I. Du Pont de Nemours and Company, Wilmington, Del.

[21] Appl. No.: 898,445

[22] Filed: Apr. 20, 1978

Related U.S. Patent Documents

Reissue of:

[64] Patent No.: 4,068,798
Issued: Jan. 17, 1978
Appl. No.: 728,001
Filed: Sep. 29, 1976

[51] Int. Cl.[2] ..... B04B 5/02

[52] U.S. Cl. ..... 233/26; 211/74

[58] Field of Search ..... 233/26, 27, 1 R, 1 A; 210/DIG. 23, DIG. 24; 23/253 R, 259; 211/74; 206/427; 220/23

[56] References Cited

U.S. PATENT DOCUMENTS

| | | | |
|---|---|---|---|
| 1,199,987 | 10/1916 | Husted | 211/74 |
| 2,615,448 | 10/1952 | Fields | 220/23 |
| 3,670,530 | 6/1972 | Filipak | 233/26 X |
| 3,674,198 | 7/1972 | Eberle | 233/26 |
| 3,713,775 | 1/1973 | Schmitz | 23/253 R |
| 3,720,368 | 3/1973 | Allen | 233/26 |
| 3,778,232 | 12/1973 | McMorrow | 23/253 R |
| 3,786,985 | 1/1974 | Blaivas | 233/26 |
| 3,830,425 | 8/1974 | Stallmann | 233/26 |
| 3,884,354 | 5/1975 | Guenther et al. | 206/427 |
| 3,905,772 | 9/1975 | Hartnett et al. | 211/74 |
| 3,980,227 | 9/1976 | Witty et al. | 233/26 X |

*Primary Examiner*—George H. Krizmanich

[57] ABSTRACT

Stoppers are separated from tubes they close by suspending a stoppered tube by its stopper, placing the suspended tube in a swinging bucket centrifuge, subjecting the suspended tube to centrifugal force.

This may be accomplished by adapting a test tube rack to be placed in a centrifuge's swinging bucket type carrier. The rack is a two piece unit having upper and lower members that are separable. The test tubes use stoppers having an enlarged portion with a diameter which exceeds that of the test tube such that the tubes may be suspended from the upper member by their stoppers. The rack has a height which exceeds that of the test tubes such that when the rack with the tubes suspended therein are subjected to centrifugal force, the tubes withdraw from the stoppers. This leaves the stoppers positioned on the upper surface of the upper member. If now the upper member is lifted away, the stoppers are removed leaving the unstoppered test tubes positioned in the lower member of the rack.

5 Claims, 7 Drawing Figures

Fig.1.
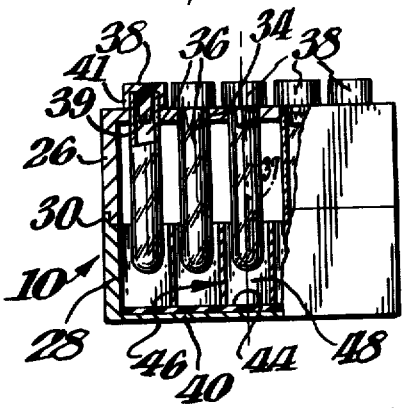
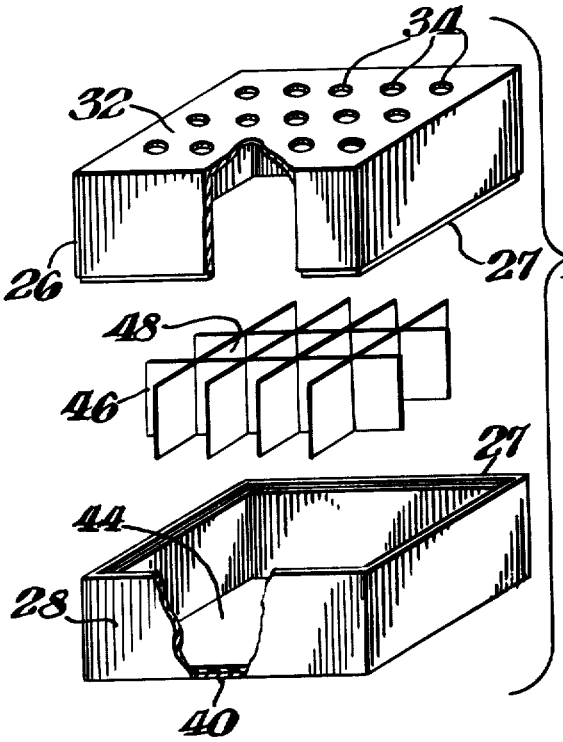
Fig.2.
Fig.7.
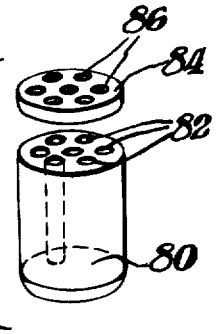
Fig.6.
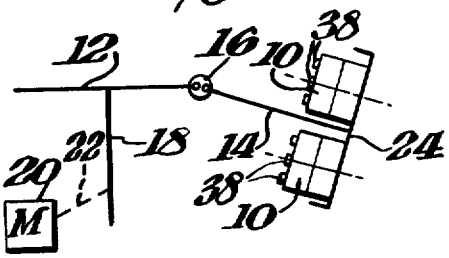
Fig.3.
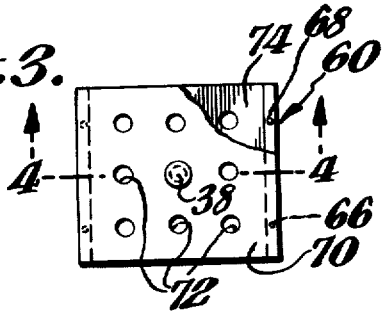
Fig.4.
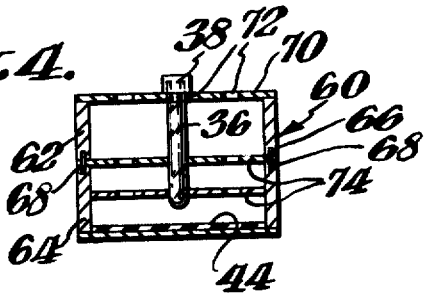
Fig.5.
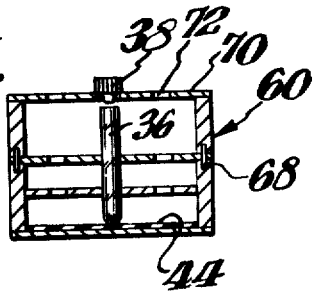

APPARATUS FOR STOPPER REMOVAL

Matter enclosed in heavy brackets [ ] appears in the original patent but forms no part of this reissue specification; matter printed in italics indicates the additions made by reissue.

BACKGROUND OF THE INVENTION

This invention relates to a method and apparatus for automatically removing stoppers from test tubes.

In many fields, it is necessary to use test tubes having caps or stoppers. Such usage implies that at some point in time, it may be desirable to remove the stopper. When large numbers of test tubes are used, such stopper removal can require an excessive amount of time. In addition, in the medical and blood testing fields, when dangerous materials are being handled, the removal of such stoppers poses no little danger to the operator or lab technician who in most instances must remove such stoppers manually. Manual stopper removal can result in dropping or spraying minute droplets of the tube contents onto the lab technician. This presents a particular problem particularly if the contents of the tubes are infectious or pathogenic.

Some little improvement over individually removing the stoppers from each tube is offered in the teachings of U.S. Pat. 3,649,464 issued Mar. 14, 1972, to Freeman. This patent teaches the use of multiple stoppers being attached to a lifting tab. While this speeds up operations, the danger to the technician remains.

It is, therefore, an object of this invention to provide a relatively simple method and apparatus that is capable of quickly and safely removing the stoppers from test tubes while reducing any danger to the operating personnel.

SUMMARY OF THE INVENTION

According to a preferred apparatus of this invention, stoppers are removed from fluid filled test tubes while the tubes' contents are being centrifuged, by pivotally suspending the test tubes by their respective stoppers, rotating the suspended tubes about an axis transverse to the several tube axes to cause the respective tubes to separate from their respective stoppers under the influence of centrifugal force, and finally supporting the separated tubes.

A preferred apparatus for performing this method uses a centrifuge having a swinging type bucket carrier. Such apparatus includes a rack adapted to be placed in the bucket type carrier and having upper and lower separable members, the upper member having an upper surface defining plural apertures adapted to receive the test tubes, each stopper having an enlarged portion with an outside diameter greater than the diameters of its associated test tube and said apertures, thereby to permit said test tubes to hang from the rack's upper surface supported only by their respective stoppers, the lower member having a bottom, supporting means associated with the lower member for supporting the test tubes against lateral movement, the distance from the bottom of the test tubes to the enlarged stopper portion being less than the distance from the upper surface to the lower member's bottom, whereby subjecting said rack to centrifugal force withdraws the tubes from the stoppers to rest on said lower member's bottom such that the stoppers can be discarded and access had to the contents of the test tubes.

This apparatus, which is capable of use in a centrifuge for the automatic removal of stoppers, has a particular advantage in that the operators are not exposed to the hazards of the contents of the test tubes. A second advantage accrues from the fact that the stoppers are removed substantially simultaneously from all of the tubes positioned in the rack while the contents of the tubes are being centrifuged. This appreciably reduces the time required for normal stopper removal and, in any event, does not require an extra step. As soon as the centrifuge is stopped, the tube contents are exposed and ready for further processing.

BRIEF DESCRIPTION OF THE DRAWINGS

Further advantages and features of this invention will become apparent upon consideration of the following description in which:

FIG. 1 is an elevation view, partially cut away, of a test tube rack capable of performing the method of this invention constructed in accordance with a preferred embodiment particularly depicting test tubes suspended in the rack by their stoppers;

FIG. 2 is an exploded view, partially cut away, of the test tube rack illustrated in FIG. 1;

FIG. 3 is a plan view, partially cut away, of a test tube rack for supporting suspending test tubes by their stoppers, constructed in accordance with a second embodiment of this invention;

FIG. 4 is a section view of the test tube rack of FIG. 3 taken along the section line 4—4;

FIG. 5 is a cross-sectional elevation view of the test tube rack of FIG. 3, taken along the section line 4—4, but in this instance depicting the test tube after its separation from the stopper by centrifugal force;

FIG. 6 is a schematic illustration of a swinging bucket centrifuge with its bucket carrier in an operating position and holding racks with stopper suspended test tubes; and FIG. 7 is another alternative adapter rack that may be used in the method of this invention.

DETAILED DESCRIPTION OF THE PREFERRED EMBODIMENTS

There may be seen with reference to FIGS. 1 and 2 a first and preferred embodiment of an apparatus for automatically removing stoppers from test tubes in accordance with the method of this invention. The apparatus depicted in FIG. 1 is seen to include a rack 10 that is adapted to be placed in a centrifuge such as that illustrated diagrammatically in FIG. 6. The apparatus of FIG. 6 constitutes a centrifuge rotor 12 of a conventional type which may pivotally mount at 16 a swinging bucket type carrier(s) 14. The carrier 14 may be a conventional omni type carrier such as that designated by the Model #00598 available from E. I. du Pont de Nemours and Co., Wilmington, DE, which is adapted to be pivotally hung on a horizontal rotor 12 for supporting various adapters. Alternatively, the carrier may be a bucket, of conventional design, structed to receive tube adapters. The horizontal rotor may be a typical four-piece unit such as Model #HL4 also available from E. I. du Pont de Nemours and Co. The rotor 12 is removably positioned on a gyroscope mount 18 of a conventional centrifuge adapted to be driven by a motor, depicted by the block 20 operating through a suitable linkage depicted by the dashed line 22.

The swinging bucket carrier 14 illustrated has a bottom platform 24 adapted to hold a pair of racks 10 constructed in accordance with a preferred embodiment of this invention. The centrifuge depicted in FIG. 6 is illustrated in its operating position with the carrier 14 pivoted outwardly from its normally vertical hanging position when at rest such that centrifugal force is exerted axially of tubes suspended in the racks 10 as will be described.

The racks 10 are seen to comprise an upper member 26 and a lower member 28. Both of the members of this embodiment are shell-like with the edge portions 27 of each member in mating relationship such that the upper and lower members 26 and 28, respectively, (each illustrated here as generally rectangular in shape) form a box-like enclosure. The mating edges 27 define a step-like interfit or joint 30 (FIG. 1) such that the upper member 26 fits into the lower member 28 and yet may be easily removed by lifting the upper member 26 away from the lower member 28. The upper member 26 has an upper surface 32 in which are formed a plurality of apertures or holes 34 sized to accommodate with a loose sliding fit a corresponding plurality of test tubes 36 of conventional design.

Each of the test tubes may be of any suitable material typically used in chemical, medical or centrifuge applications. Each tube has a cap or stopper 38 typically constructed of a resilient material such as rubber. Such stoppers are constructed such that at least the upper portion thereof is enlarged to have a diamter (or at least portions of the diameter) which exceeds the outer diameter of the test tubes 36. Typical of these tubes are evacuated blood collection tubes such as those sold for blood work by Becton Dickinson and Company, Rutherford, N.J. under the tradename "Vacutainer". In this manner, the test tubes 36 may be suspended along their axes 37 from the enlarged stoppers 38 and hence, supported solely by the upper member 26 of the rack 10.

The lower member 28 also is box-like and is provided with a bottom surface 40 for supporting the unstoppered tubes as will be described. A resilient pad 44, made of rubber or the like, is placed over the bottom 40 of the lower member 28 to permit the test tubes 36 to drop to a supporting surface without breaking, i.e., the pad is able to cushion their fall when they are subjected to centrifugal force and hence prevent such damage or breakage of the tubes. A lattice-like, lateral support 46 is adapted to fit in the lower member 28 defining a plurality of (rectangular) openings 48 that are in alignment with each of the openings 34 in the upper surface 32 such that each of the support openings 48 may receive an individual tube 36. In this manner, once the upper member 26 is removed, after the tubes are resting on the rubber pads 44, the tubes are provided with a lateral support to prevent their falling. The lattice may be shaped if desired to more closely conform to the tubes'-round configuration. The lattice and the racks may be formed of a suitable rigid metal or plastic.

To facilitate stopper removal from the tubes, the combined distance between the bottom support plate 40 and the upper surface 32 of the upper member, when in stacked or mating array, exceeds the distance measured from the bottom of the tubes up to the bottom of the enlarged portion 38 (or the bottom of any insert 39 on the stoppers). The tubes are suspended with a spacing typically of some 12 to 13 millimeters (for evacuated blood tubes) above the bottom 40 (or pad 44) of the lower member 28. This spacing must be sufficiently great such that as the tubes are urged downwardly in the drawing by the centrifugal force, there is sufficient clearance that they may be pulled or withdrawn entirely from the stoppers 38 suspended from the top surface 32. Preferably, the clearance should be one to two millimeters greater than the axial length 37 of those portions of the stopper 38 which contacts by the tube, i.e., the tubes must be permitted to drop sufficiently to be free of any portion 39 of the stoppers which grip the tubes with a sufficient force to hold the tubes in a suspended state.

The stoppers may be caps having downwardly extending skirts 41 which contact only the exterior of the upper lip portion of the test tubes or they may also have an insert 39 which fits inside of the upper lip portion. In some cases, the skirt portion 41 is omitted. In operation, the tubes 36 with their stoppers 38 engaged, i.e., the tubes are stoppered, are each positioned in a different hole 34 in the top surface 32 of the rack with the tubes suspended by their stoppers from the top surface 32. In this instance, the rack is in assembled form with the top member 26 engaged with the bottom member 28 to form the hollow box-like assembly illustrated. The rack 10 or several racks, as the case may be, are loaded with filled tubes to be centrifuged and destoppered and placed within the centrifuge carriers of FIG. 6 and the centrifuge operated with sufficient speed to cause the carriers to swing out (FIG. 6). In this manner, the axes 37 of the tubes are transverse to the spin axis (18) of the centrifuge. The contents of the tubes are centrifuged at the same time the stoppers are being removed. As the rotation speed increases, the tubes are urged away from their stoppers 38 by centrifugal force and into contact with the rubber pad 44 on the bottom of the lower member 28. The centrifuge is stopped, allowing the carriers to fall back to the vertical and the rack(s) 10 placed on a convenient table, at which time the operator simply lifts off the top member 26 carrying the stoppers 38 therewith. These stoppers may then be discarded with little or no danger to the operator. Note the removal of the tubes from the stoppers typically occurs substantially simultaneously during the centrifugal action. There is little danger to the operator or technician since the stoppers themselves need not be handled or otherwise touched with human hands following their removal. Furthermore, human hands were not a part of the actual removal in the operation thereby even further reducing any potential danger to the operator. Since the stopper removal takes place simultaneously with the centrifuging of the tube's contents and for all of the tubes in the rack, significant savings in time are achieved. It is to be noted that the centrifugal force needed simply to remove stoppers is not great since a relatively small amount of force is required to remove the tubes from the stoppers.

In an alternative embodiment of the invention, a simple rack of the type depicted in FIGS. 3 and 4 is constructed. This rack 60 may be constructed of two pieces; an upper piece 62 and a lower piece 64. Both of the pieces 62 and 64 may be constructed of sheet metal such as stainless steel of sufficient gauge so as to withstand the rigors of centrifugal action. Alternatively, they may be molded of a suitable plastic. The dimensions of the racks 60 are somewhat similar to the dimensions described in conjunction with the embodiment of FIG. 1. In this instance, the upper member 62 is constructed to be U-shaped with the open end of the U having clips or pins 66 adapted to engage receptacles 68 formed in the open end of the bottom piece 64 which also gnerally U-shaped. The upper surface 70 of the upper member 62 is formed with a plurality of apertures or holes 72 formed therein, adapted to receive the test tubes 36 having stoppers 38 of the type described herein above. The bottom member 64 also is adapted to have a resilient pad 44 placed on the bottom thereof as described previously. In addition, the upwardly extending arms of the U-shaped bottom piece 64 are joined preferably by two intermediate plates 74 each of which has apertures or holes 76 formed therein in alignment with the corresponding holes 72 in the upper plate 70 such that the tubes 36 may slide through the upper holes 72 and be received in the holes of the intermediate plates 74. As seen in FIG. 4, the tubes 36 are suspended from the top plate 70 by the stoppers 38. The rack may then be placed on the carriers 14 (FIG. 6) of a centrifuge.

During centrifugal action, the tubes 36 drop or are withdrawn from the stoppers such that their bottoms rest on the resilient pads 44 (FIG. 5) and are supported from lateral movement by the intermediate plates 74. Thus, as soon as the centrifugal action stops and the racks removed from the centrifuge, the upper rack 10 may be simply lifted off, the stoppers 38 discarded, leaving the open-ended tubes 36 ready for test, analysis and the like. Following such tests or analysis, the tubes are removed and the racks stand ready for use and re-use.

Still another apparatus for effecting the method of this invention is illustrated in FIG. 7. This apparatus includes a conventional tube adapter 80 adapted to be housed in a swinging bucket centrifuge rotor. The adapter has axial bores 82 adapted to receive tubes. A disc-like section 84 having bores 86 aligned with the bores 82. The combined height of the bores 86 and 82 must exceed the tube bottom to stopper distance as previously described. Both the adapter 80 and the section 84 fit in the bucket preferably with the upper portions of the section 84 extending slightly out of the bucket (not shown). A lifting handle for the section 84 may be provided if needed. Once the stoppers are removed, section 84 need only be lifted and the stoppers discarded leaving the centrifuged tubes opened and ready for further processing.

There has thus been described a relatively simple method and apparatus for the centrifugal removal of the stoppers of test tubes. The method and apparatus provided have many advantages in that they permit the simultaneous removal of all stoppers from a group of tubes while they are being centrifuged and has the unique advantage of reducing any danger inherent in such removal to the operator.

What is claimed is:

1. Apparatus for removing stoppers from test tubes using a centrifuge having a swinging bucket-type carrier comprising, in combination, a rack to be placed in said bucket-type carrier and having upper and lower separable members, said upper member having an upper surface defining plural apertures receiving said test tubes, at least a portion of each said stopper having an enlarged portion with an outside diameter greater than the diameter of its associated test tube, thereby to permit said test tubes to hang from said upper surface supported only by their respective stoppers, said lower member having a bottom, supporting means associated with said lower member for supporting said test tubes against lateral movement, and the spacing between the bottom of said test tubes and said lower member bottom being greater than the length of the stoppers along the axis of said tubes in contact with said tubes, whereby subjecting said rack to centrifugal force separates said test tubes from said stoppers to rest on said lower member bottom such that said stoppers can be discarded and access had to the contents of said test tubes by removing said upper member from said lower member.

2. Apparatus according to claim 1 wherein said lower member bottom is covered by a resilient pad.

3. Apparatus according to claim 2 wherein said supporting means is a horizontal plate secured to said lower member and defining openings adapted to receive said tubes.

4. Apparatus according to claim 2 wherein said supporting means is a lattice-like insert receiving the lower portion of said test tubes.

5. Apparatus according to claim 1 wherein said supporting means is a horizontal plate secured to said lower member and defining openings receiving said tubes.

[6. A method of simultaneously centrifuging the contents of and removing a stopper from a fluid filled stoppered test tube having an axis intersecting said stopper, comprising the steps of:

suspending said test tube by said stopper, subjecting said suspended tube to centrifugal force along said tube axis to cause said tube and contents to separate from said stoppers under the influence of said centrifugal force, and supporting said separated tube.]

* * * * *